US009563088B2

(12) United States Patent
Lee et al.

(10) Patent No.: US 9,563,088 B2
(45) Date of Patent: Feb. 7, 2017

(54) CURVED DISPLAY DEVICE

(71) Applicant: Samsung Display Co., Ltd., Yongin, Gyeonggi-Do (KR)

(72) Inventors: Heehwan Lee, Hwaseong-si (KR); Kyusu Ahn, Seoul (KR); SuWan Woo, Osan-si (KR); In-Jae Hwang, Suwon-si (KR)

(73) Assignee: Samsung Display Co., Ltd. (KR)

( * ) Notice: Subject to any disclaimer, the term of this patent is extended or adjusted under 35 U.S.C. 154(b) by 1 day.

(21) Appl. No.: 14/806,069

(22) Filed: Jul. 22, 2015

(65) Prior Publication Data

US 2016/0077388 A1 Mar. 17, 2016

(30) Foreign Application Priority Data

Sep. 16, 2014 (KR) ........................ 10-2014-0122842

(51) Int. Cl.
*G02F 1/1343* (2006.01)
*G02F 1/1337* (2006.01)

(52) U.S. Cl.
CPC ... *G02F 1/134336* (2013.01); *G02F 1/133707* (2013.01); *G02F 2001/134345* (2013.01)

(58) Field of Classification Search
CPC ................. G02F 1/134336; G02F 1/133707; G02F 2001/134345
See application file for complete search history.

(56) References Cited

U.S. PATENT DOCUMENTS

| 2014/0375936 A1 | 12/2014 | Park et al. |
| 2015/0029449 A1 | 1/2015 | Woo et al. |
| 2015/0036073 A1 | 2/2015 | Im et al. |
| 2015/0042939 A1 | 2/2015 | Park et al. |

FOREIGN PATENT DOCUMENTS

| CN | 104345500 A | 2/2015 |
| EP | 2833198 A2 | 2/2015 |
| EP | 2833200 A1 | 2/2015 |
| JP | 2015-031961 A | 2/2015 |
| KR | 10-0914580 B1 | 8/2009 |
| KR | 10-2011-0008422 A | 1/2011 |
| KR | 10-2013-0018289 A | 11/2012 |
| KR | 10-2014-0147299 A | 6/2013 |
| KR | 10-2015-0044293 A | 10/2013 |
| KR | 10-2014-0001305 | 1/2014 |
| KR | 10-2015-0004140 A | 1/2015 |
| KR | 10-2015-0014197 A | 2/2015 |
| KR | 10-2015-0016014 A | 2/2015 |
| KR | 10-2015-0016016 A | 2/2015 |
| KR | 10-2015-0016462 A | 2/2015 |

(Continued)

*Primary Examiner* — Donald Raleigh
(74) *Attorney, Agent, or Firm* — Innovation Counsel LLP

(57) ABSTRACT

Provided is a display device including a display substrate, an opposite substrate and a liquid crystal layer. The display substrate has a plurality of pixel areas and a first side curved along a first direction. The opposite substrate faces the display substrate and is coupled to the display substrate to be curved along the first direction. The liquid crystal layer is disposed between the display substrate and the opposite substrate. In each of the plurality of pixel areas, a plurality of domains are arranged in a second direction intersecting with the first direction, and a side of at least one of the plurality of domains is tilted with respect to the first side.

20 Claims, 9 Drawing Sheets

(56) References Cited

FOREIGN PATENT DOCUMENTS

| KR | 10-2015-0020366 A | 2/2015 |
|----|-------------------|--------|
| KR | 10-2015-0024680 A | 3/2015 |
| KR | 10-2015-0030037 A | 3/2015 |
| KR | 10-2015-0031113 A | 3/2015 |
| KR | 10-2015-0049536 A | 5/2015 |
| KR | 10-2015-0055888 A | 5/2015 |
| KR | 10-2015-0070755 A | 6/2015 |
| KR | 10-2015-0070789 A | 6/2015 |
| KR | 10-2015-0071411 A | 6/2015 |
| KR | 1020150081626     | 7/2015 |

CURVED DISPLAY DEVICE

CROSS-REFERENCE TO RELATED APPLICATIONS

This U.S. non-provisional patent application claims priority under 35 U.S.C. §119 of Korean Patent Application No. 10-2014-0122842, filed on Sep. 16, 2014, the entire contents of which are hereby incorporated by reference.

BACKGROUND

The present disclosure herein relates to a display panel and a curved display device including the same, and more particularly, to a display device having a curved display region.

Display devices, like a liquid crystal display device, are used for displaying images in various information processing devices, such as televisions, monitors, and laptop computers. Recently, a curved display device that has a curved shape and thus provides a curved display region has been developed. The curved display device may provide a user with an image having an enhanced three-dimensional effect, immersive effect and presence effect by using a curved display region.

SUMMARY

The present disclosure herein provides a curved display device with enhanced display quality.

Embodiments of the present system and method provide curved display devices including a display substrate, an opposite substrate and a liquid crystal layer. The display substrate has a plurality of pixel areas and a first side curved along a first direction. The opposite substrate faces the display substrate and is coupled to the display substrate to be curved along the first direction. The liquid crystal layer is disposed between the display substrate and the opposite substrate.

In each of the plurality of pixel areas, a plurality of domains are arranged in a second direction intersecting with the first direction, and a side of at least one of the plurality of domains is tilted with respect to the first side.

Embodiments of the present system and method provide curved display devices including a display substrate, an opposite substrate and a liquid crystal layer. The display substrate has a plurality of pixel areas and a first side curved along a first direction. The opposite substrate faces the display substrate and is coupled to the display substrate to be curved along the first direction. The liquid crystal layer is disposed between the display substrate and the opposite substrate.

The display substrate comprises a pixel electrode disposed in each of the plurality of pixel areas, and the pixel electrode comprises branch portions disposed in each of the plurality of domains, In each of the plurality of pixel areas, a plurality of domains are arranged in a second direction intersecting with the first direction, a side connecting edges of the branch portions in each of the plurality of domains is defined, and the side is tilted with respect to the first side in a plan view.

BRIEF DESCRIPTION OF THE DRAWINGS

The accompanying drawings are included to provide a further understanding of the present system and method and are incorporated in and constitute a part of this specification. The drawings illustrate exemplary embodiments of the present system and method and, together with the description, serve to explain principles thereof. In the drawings.

DETAILED DESCRIPTION OF THE EMBODIMENTS

Exemplary embodiments of the present system and method are described in detail hereinafter with reference to the accompanying drawings. Objects, other objects, advantages and features of the present system and method will be apparent to those of ordinary skill in the art when the exemplary embodiments described herein are considered in conjunction with the accompanying drawings. The present system and method may, however, be embodied in many different forms and are not limited to the embodiments set forth herein. Rather, these embodiments are provided to help those of ordinary skill in the art understand the present system and method. Accordingly, the scope of the present system and method is not limited to the embodiments set forth herein. In embodiments and drawings hereinafter, like reference symbols or numerals are used for like elements.

Also, in the present disclosure, the terms "first", "second" or the like are used only for the purpose of distinguishing one element from others, and therefore, the elements are not limited by the terms. Furthermore, when a portion of a layer, a region, a component, etc., is referred to as being "on" another portion, it may be directly on the other portion, or an intervening layer, region, component, etc., may also be present.

Figure 1:
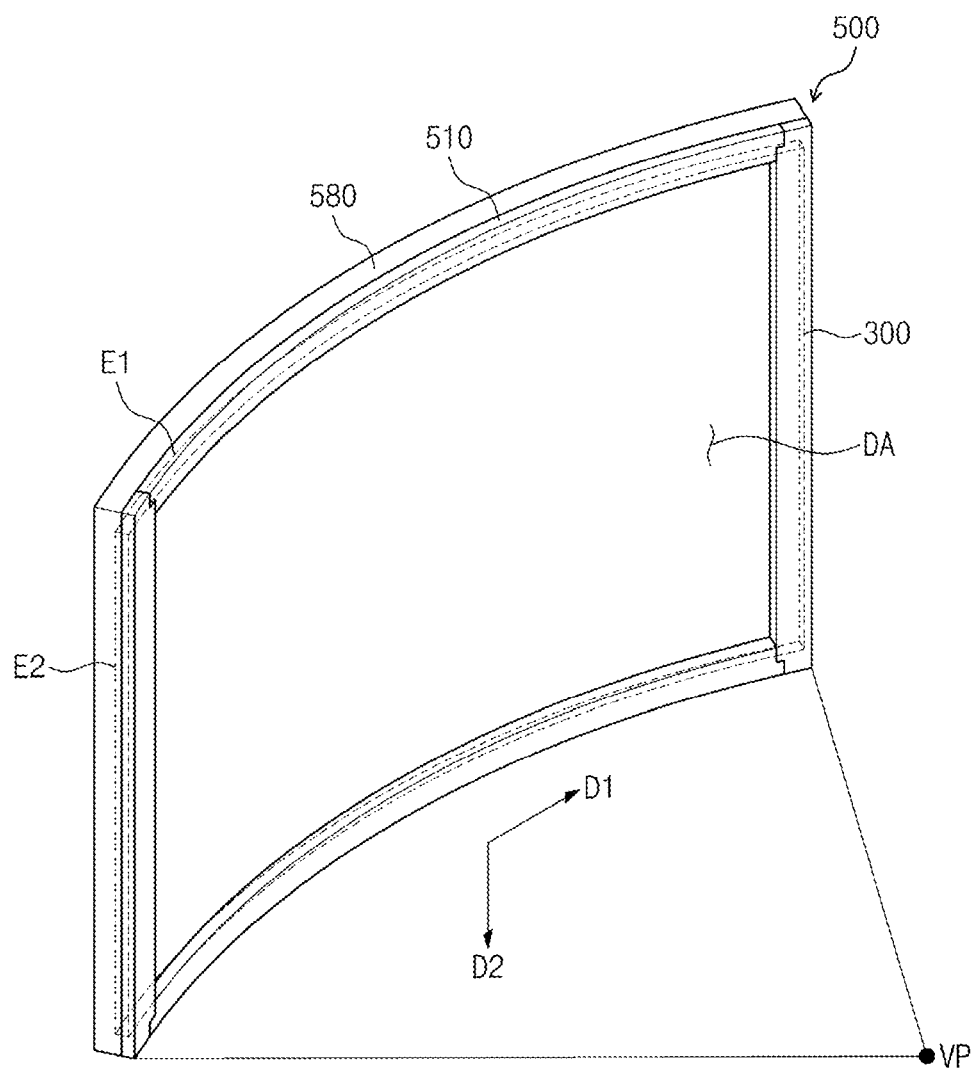
FIG. 1 is a perspective view illustrating a curved display device according to an exemplary embodiment of the present system and method.

FIG. 1 is a perspective view illustrating a curved display device 500 according to an exemplary embodiment of the present system and method.

Referring to FIG. 1, the curved display device 500 has a shape curved along a first direction D1 and provides a display area DA with a curved shape. In the present exemplary embodiment, viewer's viewing point VP may be defined at a front side of the curved display device 500, and the display area DA may have a shape of a concavely-curved surface at the front side of the curved display device 500.

The curved display device 500 includes a display panel 300 that may be bent along the first direction D1 to have a shape curved along the first direction D1. A first edge E1 may be defined as a long side of the display panel 300, and a second edge E2 may be defined as a short side of the display panel 300. The second edge E2 may have a straight line shape parallel to the second direction D2 that is perpendicular to the first direction D1.

The curved display device 500 may further include a plurality of members connected to the display panel 300 to cause the display panel 300 to be curved along the first direction D1 and maintain the shape of the display panel 300 curved along the first direction D1. In the present exemplary embodiment, the plurality of members may include an accommodation member 580 accommodating the display panel 300 and a cover member 510 coupled to the accommodation member 580 and covering the display panel 300.

When the display panel 300 is not coupled to the cover member 510 and the accommodation member 580, the display panel 300 may have a flat shape. When the display panel 300 is coupled to the cover member 510 and the accommodation member 580, the display panel 300 may have a curved shape. Accordingly, each of the accommodation member 580 and cover member 510 may have a curved shape corresponding to a curved shape of the display panel 300 in the curved display device 500. For example, a bottom portion of the accommodation member 580 facing the rear surface of the display panel 300 may have a shape curved along the first direction D1, and a portion of the cover member 510 covering the first edge E1 of the display panel 300 may have a shape curved along the first direction D1.

In the present exemplary embodiment, the display panel 300 may be a liquid crystal display panel. In this case, the curved display device 500 may further comprise a backlight assembly (not shown) providing light to the display panel 300. The backlight assembly may be accommodated in the accommodation member 580 together with the display panel 300.

Figure 2:
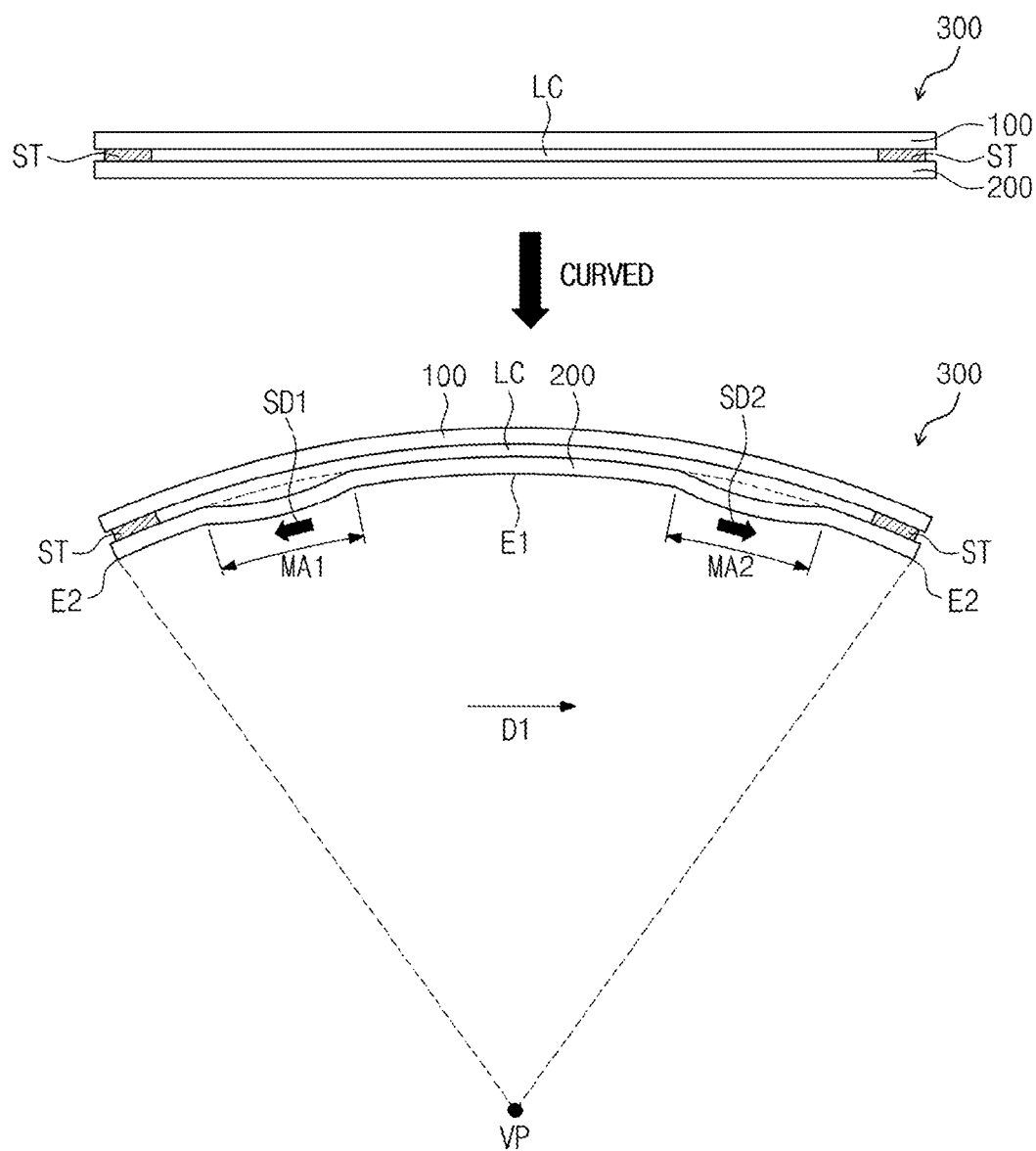
FIG. 2 is a plan view illustrating a display panel of the curved display device of FIG. 1.

FIG. 2 is a plan view illustrating the display panel 300 of the curved display device of FIG. 1. In FIG. 2, a curved state and a flat state of the display panel 300 are illustrated.

Referring to FIG. 2, the display panel 300 comprises a display substrate 100, an opposite substrate 200 facing the display substrate 100, a liquid crystal layer LC disposed between the display substrate 100 and the opposite substrate 200, and a sealant ST. The sealant ST may be provided along the edges of the display substrate 100 and/or the opposite substrate 200. The display substrate 100 may be bonded to the opposite substrate 200 by the sealant ST with the liquid crystal layer LC disposed therebetween.

When the display panel 300 is changed from a flat state to a curved state, a lift phenomenon may partially occur in the opposite substrate 200 because it has a smaller curvature radius than that of the display substrate 100. The lift phenomenon may cause a misalignment to occur in such a way that the alignment between the display substrate 100 and the opposite substrate 200 in their flat state cannot be maintained in their curved state. In other words, when the display panel 300 is in a flat state, the misalignment does not occur. However, when the display panel 300 is changed to be in a curved state, the misalignment may occur. The misalignment may occur when the display panel 300 is curved. That is, the misalignment may occur when the display panel 300 having a flat shape originally is curved by a supporting force of the accommodation member (580 in FIG. 1) and the cover member (510 in FIG. 1).

A direction along which the opposite substrate 200 is shifted by the misalignment with respect to the display substrate 100 may be defined as a shift direction. A position at which the misalignment occurs and the shift direction may be defined as follows below according to the present exemplary embodiment.

A first area MA1 and a second area MA2 are defined in the display panel 300. The first area MA1 may be a left-hand area of the display area (DA in FIG. 1), and the second area MA2 may be a right-hand area of the display area. In the present exemplary embodiment, the misalignment may occur in each of the first and second areas MA1 and MA2, and the shift direction may be defined as a first shift direction SD1 in the first area MA1 and as a second shift direction SD2 in the second area MA2. With respect to the viewer's viewing point VP, the first shift direction SD1 may be the direction approximately towards the left-hand edge E2 of the display panel 300, and the second shift direction SD2 may be the direction approximately towards the right-hand edge E2 of the display panel 300.

Figure 3A:
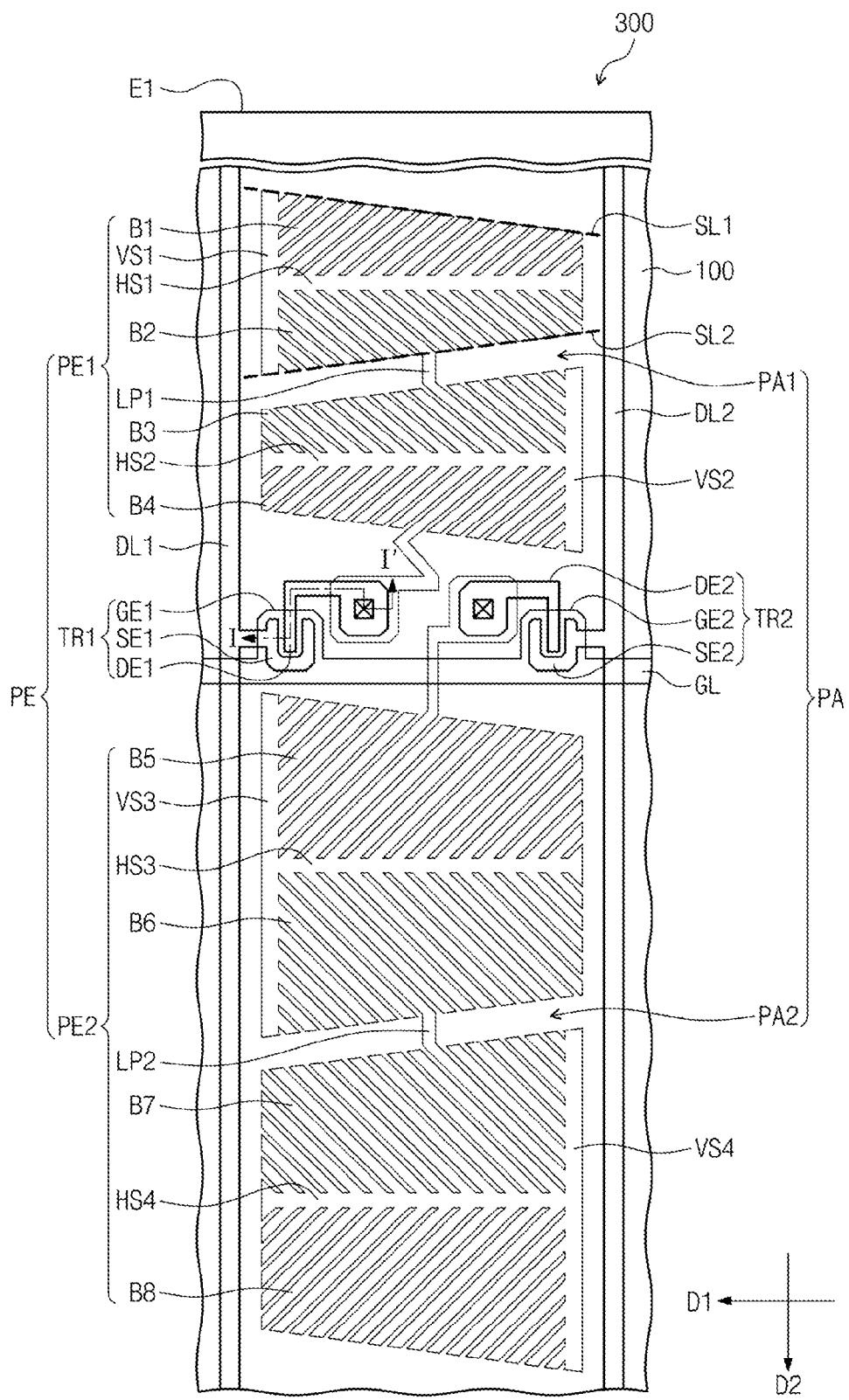
FIG. 3A is a plan view illustrating a pixel included in the display panel of FIG. 2.
Figure 3B:
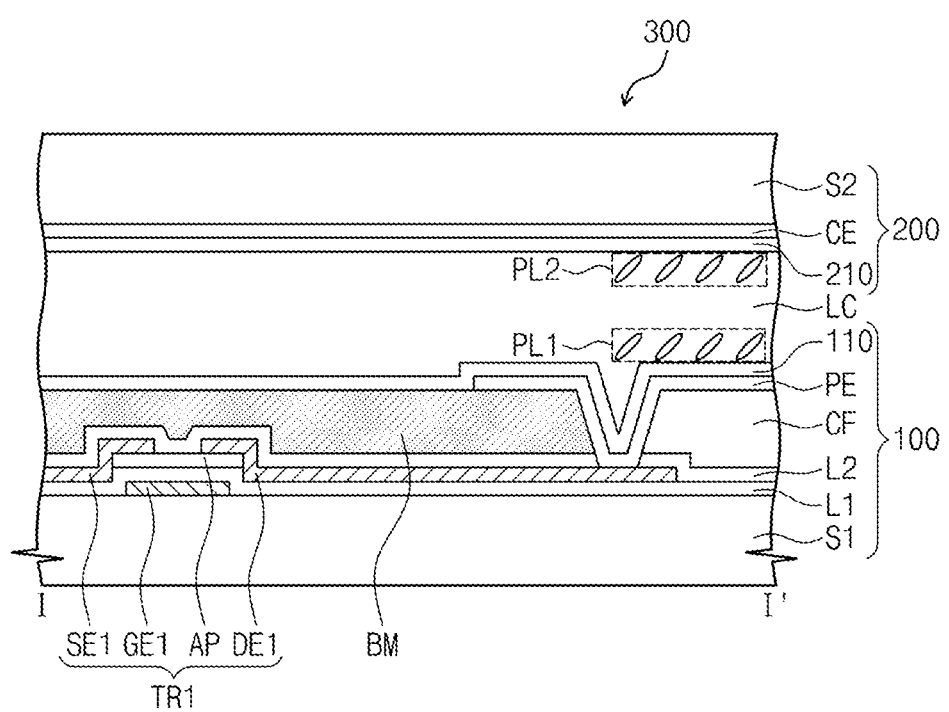
FIG. 3B is a cross-sectional view taken along line I-I' in FIG. 3A.

In embodiments of the present system and method, as illustrated in FIG. 3B, even though the misalignment occurs, a pre-tilt orientation of each liquid crystal molecule pre-tilted by a first alignment film (110 in FIG. 3B) and a pre-tilt direction of each liquid crystal molecule pre-tilted by a second alignment film (210 in FIG. 3B) may be identical with each other. More detailed description about this is given below.

FIG. 3A is a plan view illustrating a pixel included in the display panel 300 of FIG. 2. FIG. 3B is a cross-sectional view taken along line IT in FIG. 3A. Although the display panel 300 includes a plurality of pixels, FIGS. 3A and 3B illustrate one of the plurality of pixels as an example. Illustration of the remaining pixels is omitted.

Referring to FIGS. 3A and 3B, the display panel 300 includes a display substrate 100, an opposite substrate 200, and a liquid crystal layer LC. The display substrate 100 includes a first base substrate S1, a gate line GL, a first data line DL1, a second data line DL2, a first thin-film transistor TR1, a second thin-film transistor TR2, a pixel electrode PE, and a first alignment film 110.

The first base substrate S1 may be an insulation substrate capable of transmitting light, such as a glass substrate and a plastic substrate. The gate line GL is disposed on the first base substrate S1 and electrically connected to the first and second thin-film transistors TR1 and TR2 to transmit a gate signal to the first and second thin-film transistors TR1 and TR2.

In the present exemplary embodiment, a pixel area PA may include a first sub-pixel area PA1 and a second sub-pixel area PA2. In this case, the pixel electrode PE may include a first sub-pixel electrode PE1 disposed in the first sub-pixel area PA1 and a second sub-pixel electrode PE2 disposed on the second sub-pixel area PA2.

The first and second data lines DL1 and DL2 are insulated from the gate line GL and disposed on the first base substrate S1. The first data line DL1 transmits a first data signal, and the second data line DL2 transmits a second data signal. In the present exemplary embodiment, the first data line DL1 extends along one side of the first and second sub-pixel electrodes PE1 and PE2, and the second data line DL2 extends along the opposite side of the first and second sub-pixel electrodes PE1 and PE2. That is, the first and second sub-pixel electrodes may be located between the first and second data lines DL1 and DL2.

The first thin-film transistor TR1 is electrically connected to the gate line GL, the first data line DL1, and the first sub-pixel electrode PE1. When the first thin-film transistor TR1 is turned on, the first data signal may be transmitted to the first sub-pixel electrode PE1.

The first thin-film transistor TR1 includes a first gate electrode GE1, an active pattern AP, a first source electrode SE1, and a first drain electrode DE1. The first gate electrode GE1 branches from the gate line GL. The active pattern AP may be disposed on the first gate electrode GE1 with a first insulating layer L1 disposed therebetween. The source electrode SE1 branches from the first data line DL1 and contacts the active pattern AP. The first drain electrode DE1 is spaced apart from the source electrode SE1 and contacts the active pattern AP.

A second insulating layer L2 covers the first thin-film transistor TR1. A color filter CF and a black matrix layer BM are disposed on the second insulating layer L2. The color filter CF is positioned to correspond to each of the first and second sub-pixel areas PA1 and PA2. The black matrix layer BM is disposed on a non-pixel area to cover the first and second thin-film transistors TR1 and TR2.

The first sub-pixel electrode PE1 is disposed on the color filter CF and contacts the first drain electrode DE1 through a contact hole in the second insulating layer L2.

The second thin-film transistor TR2 is electrically connected to the gate line GL, the second data line DL2, and the second sub-pixel electrode PE2. When the second thin-film transistor TR2 is turned on by the gate signal, the second data signal may be transmitted to the second sub-pixel electrode PE2. The second thin-film transistor TR2 includes a second gate electrode GE2, a second source electrode SE2, and a second drain electrode DE2.

As described above, in the present exemplary embodiment, the first data signal may be transmitted to the first sub-pixel electrode PE1 through the first thin-film transistor TR1, and the second data signal different from the first data signal may be transmitted to the second sub-pixel electrode PE2 through the second thin-film transistor TR2. Therefore, because the first and second sub-pixel electrodes PE1 and PE2 are driven by different data signals, different gray scales may be respectively displayed on the first and second sub-pixel areas PA1 and PA2.

The first alignment film 110 is disposed on the first and second sub-pixel electrodes PE1 and PE2 and contacts the liquid crystal layer LC. The first alignment film 110 aligns and pre-tilts liquid crystal molecules PL1 with respect to the first base substrate S1.

The opposite substrate 200 includes a second base substrate S2, a common electrode CE, and a second alignment film 210. The second base substrate S2 may be an insulation substrate capable of transmitting light, such as a glass substrate and a plastic substrate.

The common electrode CE is disposed on the second base substrate S2 and, together with the first and second sub-pixel electrodes PE1 and PE2, generates an electric field that acts on the liquid crystal layer LC. Also, the second alignment film 210 aligns and pre-tilts liquid crystal molecules PL2 with respect to the second base substrate S2.

In the present exemplary embodiment, the first sub-pixel electrode PE1 includes a first horizontal stem portion HS1, a second horizontal stem portion HS2, a first domain linking portion LP1, a first vertical stem portion VS1, a second vertical stem portion VS2, and first to fourth branch portions B1, B2, B3 and B4. Also, the second sub-pixel electrode PE2 includes a third horizontal stem portion HS3, a fourth horizontal stem portion HS4, a second domain linking portion LP2, a third vertical stem portion VS3, a fourth vertical stem portion VS4, and fifth to eighth branch portions B5, B6, B7 and B8.

In the present exemplary embodiment, although the first sub-pixel electrode PE1 differs in size from the second sub-pixel electrode PE2, the first and second sub-pixel electrodes PE1 and PE2 may have a structure similar to each other. Accordingly, the first sub-pixel electrode PE1 of the first and second sub-pixel electrodes PE1 and PE2 are described as an example, and descriptions about the second sub-pixel electrode PE2 are omitted herein.

The first vertical stem portion VS1 is connected to the first horizontal stem portion HS1, the first branch portions B1 and the second branch portions B2. The second vertical stem portion VS2 is connected to the second horizontal stem portion HS2, the third branch portions B3 and the fourth branch portions B4. In the present exemplary embodiment, each of the first and second vertical stem portions VS1 and VS2 may extend in the second direction D2, and the second direction D2 may intersect with the first direction along which the display panel 300 is curved. In the present exemplary embodiment, the second direction D2 may be perpendicular to the first direction D1 in a plan view, such as from the viewer's viewpoint VP.

The first horizontal stem portion HS1 is connected to the first vertical stem portion VS1, the first branch portions B1, and the second branch portions B2. In the present exemplary embodiment, the first horizontal stem portion HS1 may extend in the first direction D1 and branch from the first vertical stem portion VS1. The first horizontal stem portion HS1 may be located between first and second domains (DM1 and DM2 in FIG. 4).

The second horizontal stem portion HS2 is connected to the second vertical stem portion VS2, the third branch portions B3, and the fourth branch portions B4. In the present exemplary embodiment, the second horizontal stem portion HS2 may extend in the first direction D1 and branch from the second vertical stem portion VS2. The second horizontal stem portion HS2 may be located between third and fourth domains (DM3 and DM4 in FIG. 4).

The first domain linking portion LP1 is located between the second and third domains (DM2 and DM3 in FIG. 4) and links the second and third branch portions B2 and B3. In the present exemplary embodiment, the first domain linking portion LP1 may extend in the second direction D2. However, the first domain linking portion LP1 may extend in a direction tilted with respect to each of the first and second directions D1 and D2 in a plan view (e.g., extending obliquely to the first direction D1 or second direction D2).

The first branch portions B1 and second branch portions B2 are connected to the first horizontal stem portion HS1 or the first vertical stem portion VS1. Each of the first branch portions B1 and each of the second branch portions B2 may extend in a direction tilted with respect to each of the first and second directions D1 and D2 in a plan view. In the present exemplary embodiment, the first branch portions B1 may be symmetrical to the second branch portions B2 with respect to the first horizontal stem portion HS1. In another exemplary embodiment, the direction in which each of the first branch portions B1 extends may be identical to the direction in which each of the second branch portions B2 extends.

The third branch portions B3 and fourth branch portions B4 are connected to the second horizontal stem portion HS2 or the second vertical stem portion VS2. Each of the third branch portions B3 and each of the fourth branch portions B4 may extend in a direction tilted with respect to each of the first and second directions D1 and D2 in a plan view. In the present exemplary embodiment, the third branch portions B3 may be symmetrical to the fourth branch portions B4 with respect to the second horizontal stem portion HS2. In another exemplary embodiment, the direction in which each of the third branch portions B3 extends may be identical to the direction in which each of the fourth branch portions B4 extends.

Figure 4:
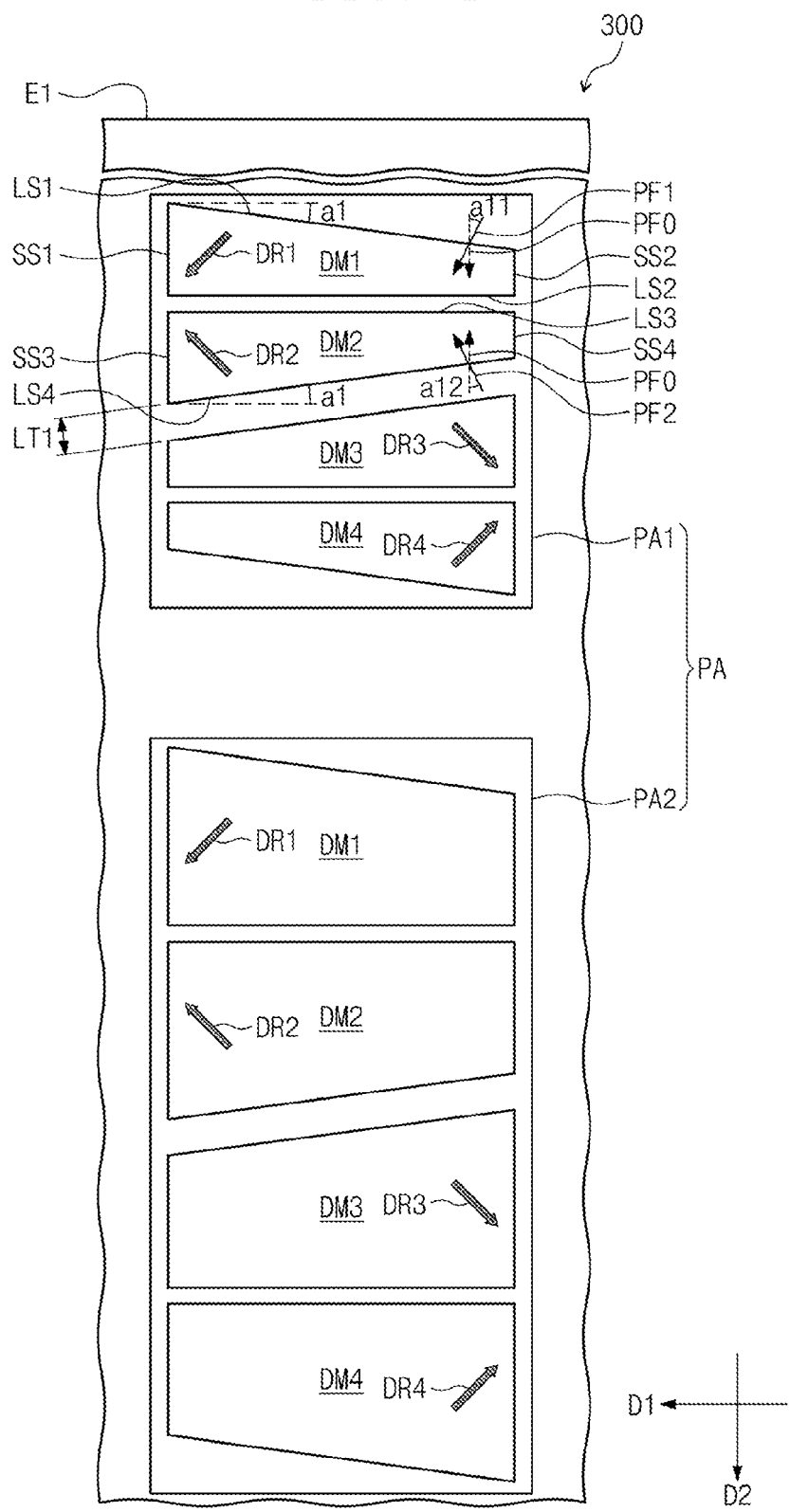
FIG. 4 is a view illustrating a plurality of domains defined in the pixel illustrated in FIG. 3A and alignment directions of liquid crystal defined in the domains.

FIG. 4 is a view illustrating a plurality of domains defined in the pixel illustrated in FIG. 3A and alignment directions of liquid crystal defined in the domains.

Referring to FIGS. 3A and 4, a pixel area PA has the first sub-pixel area PA1 and the second sub-pixel area PA2, and the first to fourth domains DM1, DM2, DM3 and DM4 are defined in each of the first and second sub-pixel areas PA1 and PA2. The first to fourth domains DM1, DM2, DM3 and DM4 are arranged in the second direction D2 in each of the first and second sub-pixel areas PA1 and PA2.

In the present exemplary embodiment, the size of the domains in the second sub-pixel area PA2 may be larger than that of the domains in the first sub-pixel area PA1. However, the shape of the domains in the second sub-pixel area PA2 may be the same as that of the corresponding domains in the first sub-pixel area PA1. Also, the alignment direction of the liquid crystal molecules in the domains in the second sub-pixel area PA2 may be the same as that of the corresponding domains in the first sub-pixel area PA1. Accordingly, while descriptions about the structures and functions of the domains defined in the first sub-pixel area PA1 are given below, descriptions about the structures and functions of the domains defined in the second sub-pixel area PA2 are omitted herein.

When the first to fourth branch portions B1, B2, B3 and B4 are disposed in the first sub-pixel area PA1 as shown in FIG. 3A, the alignment directions DR1, DR2, DR3, and DR4 of the liquid crystal molecules in the first to fourth domains DM1, DM2, DM3, and DM4 are defined by the shapes of the first to fourth branch portions B1, B2, B3 and B4, respectively.

In the present exemplary embodiment, the alignment directions of the liquid crystal defined in the first to fourth domains DM1, DM2, DM3 and DM4 are different from each other. More particularly, in the first domain DM1, liquid crystal molecules of the liquid crystal layer (LC in FIG. 3B) are aligned in a first liquid crystal alignment direction DR1 in response to an electric field formed between the pixel electrode PE and the common electrode CE. The first liquid crystal alignment direction DR1 may be approximately parallel to each of the first branch portions B1 and extend from the end of each of the first branch portions B1 toward the first horizontal stem portion HS1. Therefore, when the electric field is generated, the liquid crystal molecules in the first domain DM1 are aligned in such a way that the major axis of each liquid crystal molecule is parallel to the first liquid crystal alignment direction DR1 in a plan view (e.g., view shown in FIG. 4).

In the second domain DM2, the liquid crystal molecules are aligned in a second liquid crystal alignment direction DR2. The second liquid crystal alignment direction DR2 may be approximately parallel to each of the second branch portions B2 and extend from the end of each of the second branch portions B2 toward the first horizontal stem portion HS1. Therefore, when the electric field is generated, the liquid crystal molecules in the second domain DM2 are aligned in such a way that the major axis of each liquid crystal molecule is parallel to the second liquid crystal alignment direction DR2 in a plan view.

Also, in the same way as the first and second liquid crystal alignment directions DR1 and DR2, a third liquid crystal alignment direction DR3 may be defined in the domain DM3, and a fourth liquid crystal alignment direction DR4 may be defined in the domain DM4. Accordingly, when the electric field is generated, the liquid crystal molecules in the third domain DM3 are aligned in such a way that the major axis of each liquid crystal molecule is parallel to the third liquid crystal alignment direction DR3 in a plan view, and the liquid crystal molecules in the fourth domain DM4 are aligned in such a way that the major axis of each liquid crystal molecule is parallel to the fourth liquid crystal alignment direction DR4 in a plan view.

In the present exemplary embodiment, each of the first to fourth domains DM1, DM2, DM3 and DM4 may have a long side tilted in a plan view with respect to the first edge E1 of the display panel 300. More detailed descriptions about the structures of the first and second domains DM1 and DM2 among the first to fourth domains DM1, DM2, DM3 and DM4, are given below.

The first domain DM1 includes a first long side LS1, a second long side LS2, a first short side SS1, and a second short side SS2. The second long side LS2 is parallel to the first edge E1, and the first long side LS1 may be tilted in a plan view with respect to the first edge E1. The second domain DM2 includes a third long side LS3, a fourth long side LS4, a third short side SS3, and a fourth short side SS4. The third long side LS3 is parallel to the first edge E1, and the fourth long side LS4 may be tilted in a plan view with respect to the first edge E1.

The first long side LS1 may be defined as a first straight dotted line SL1 (see FIG. 3) connecting edges of the first branch portions B1. Similarly, the fourth long side LS4 may be defined as a second straight dotted line SL2 (see FIG. 3) connecting edges of the fourth branch portions B4.

In the present exemplary embodiment, an acute angle a1 formed by each of the first and fourth long sides LS1 and LS4 and the first edge E1, in a plan view, may be about 3° to about 20°. More particularly, the acute angle a1 may be defined in the above range by the following equation.

$$a1 = \sin^{-1}(\text{connection clearance/misalignment length}) \quad \text{[Equation]}$$

The connection clearance LT1 may be defined as a clearance between the second domain DM2 and the third domain DM3. The misalignment length may be defined as a length of a misalignment between the display substrate (100 in FIG. 2) and the opposite substrate (200 in FIG. 2) in the shift direction described above with reference to FIG. 2. In the equation above, for example, when the misalignment length is about 35 μm and the connection clearance is about 6 μm, the acute angle a1 may be about 9.6°.

In the present exemplary embodiment, each of the first and second short sides SS1 and SS2 may be parallel to the second direction D2, and the first short side SS1 may be longer than the second short side SS2. Also, each of the third and fourth short sides SS3 and SS4 may be parallel to the second direction D2, and the third short side SS3 may be longer than the fourth short side SS4.

When each of the first and fourth long sides LS1 and LS4 is tilted with respect to the first edge E1, such as described above, the following effects may occur.

A first fringe field PF1 is formed adjacent to the first long side LS1 by the first branch portions B1 and directed from each edge of the first branch portions B1 toward the inside of the first domain DM1. In contrast with embodiments of the present system and method, when the first long side LS1 is parallel to the first edge E1, a fringe field PF0 approximately perpendicular to the first edge E1 may be generated at an edge of the first domain DM1, and the angle formed between the fringe field PF0 and the first liquid crystal alignment direction DR1 may be about 45°. However, as in the present exemplary embodiment, when the first long side LS1 is tilted in a plan view with respect to the first edge E1, the first fringe field PF1, which approximately forms a first angle a11 with the fringe field PF0, may be generated at an edge of the first domain DM1. Accordingly, an angle formed by the first fringe field PF1 and the first liquid crystal alignment direction DR1 may be approximately reduced by an angle of 45° minus the first angle a11.

Also, a second fringe field PF2 is formed adjacent to the fourth long side LS4 by the second branch portions B2 and directed from each edge of the second branch portions B2 toward the inside of the second domain DM2. In contrast with embodiments of the present system and method, when the fourth long side LS4 is parallel to the first edge E1, a fringe field PF0 approximately perpendicular to the first edge E1 may be generated at an edge of the second domain DM2, and the angle formed between the fringe field PF0 and the second liquid crystal alignment direction DR2 may be about 45°. However, as in the present exemplary embodiment, when the fourth long side LS4 is tilted in a plan view with respect to the first edge E1, the second fringe field PF2, which approximately forms a second angle a12 with the fringe field PF0, may be generated at an edge of the second domain DM2. Accordingly, an angle formed by the second fringe field PF2 and the second liquid crystal alignment direction DR2 may be approximately reduced by an angle of 45° minus the second angle a12.

Therefore, in the case where the first and second fringe fields PF1 and PF2 are generated in each of the first and second domains DM1 and DM2, rather than in the case where the fringe field PF0 is generated in each of the first and second domains DM1 and DM2, the major axis of each liquid crystal molecule may be more easily aligned in the first liquid crystal alignment direction DR1 at an edge of the first domain DM1 by using the first fringe field PF1, and the major axis of each liquid crystal molecule may be more easily aligned in the second liquid crystal alignment direction DR2 at an edge of the second domain DM2 by using the second fringe field PF2. As a result, controllability for controlling the alignment of the liquid crystal molecules at the edges of the first and second domains DM1 and DM2 may be enhanced, and thus, light transmittance of the first and second domains DM1 and DM2 may be controlled more easily.

Figure 5:
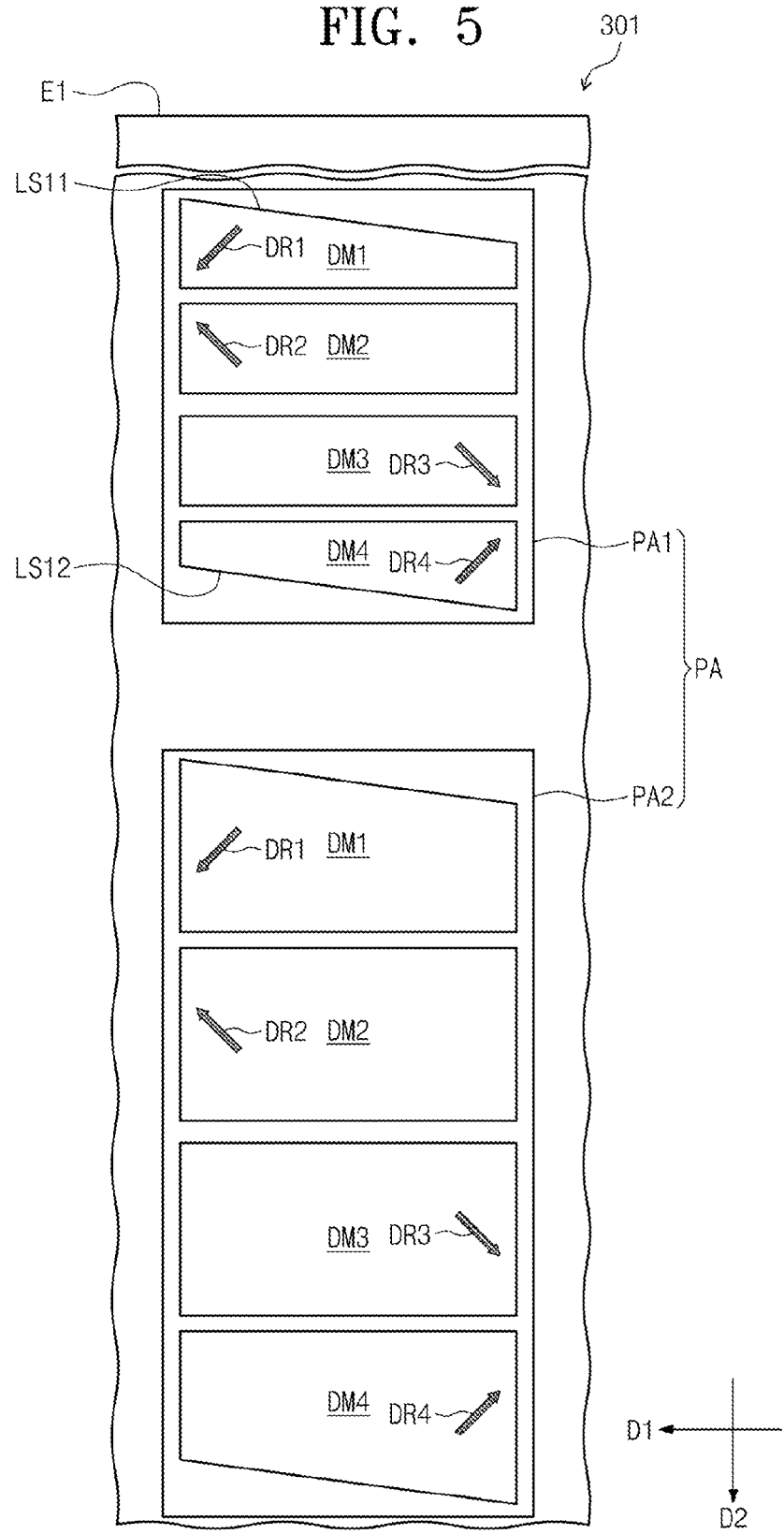
FIG. 5 is a view illustrating a plurality of domains defined in the pixel area of a display panel included in a curved display device according to another exemplary embodiment of the present system and method.

FIG. 5 is a view illustrating a plurality of domains defined in a pixel area PA of a display panel 301 included in a curved display device according to another exemplary embodiment of the present system and method. The description of FIG. 5 below uses the same reference symbols as those used for the above-mentioned components. Thus, any repetitive descriptions these components are omitted herein.

Referring to FIG. 5, a single pixel of the display panel 301 included in the curved display device is illustrated. Like FIG. 4, a plurality of domains are defined in the first and second sub-pixel areas PA1 and PA2 of the pixel area PA. Among the domains defined in the first and second sub-pixel areas PA1 and PA2, the structures of the first to fourth domains DM1, DM2, DM3 and DM4 defined in the first sub-pixel area PA1 are described below.

In the present exemplary embodiment, each of the first and fourth domains DM1 and DM4 has a long side tilted with respect to the first edge E1 in a plan view, and a long side of each of the second and third domains DM2 and DM3 is parallel to the first edge E1 in a plan view.

More particularly, the first domain DM1 has a first long side LS11 tilted with respect to the first edge E1 in a plan view, and the fourth domain DM4 has a second long side LS12 tilted with respect to the first edge E1 in a plan view. In addition, each long side of the second and third domains DM2 and DM3 is parallel to the first edge E1.

When the first and fourth domains DM1 and DM4 have the first and second long side LS11 and LS12, the alignment of the liquid crystal molecules may be more easily controlled by a fringe field acting on the edges of the first and fourth domains DM1 and DM4 as described above with reference to FIG. 4.

Figure 6:
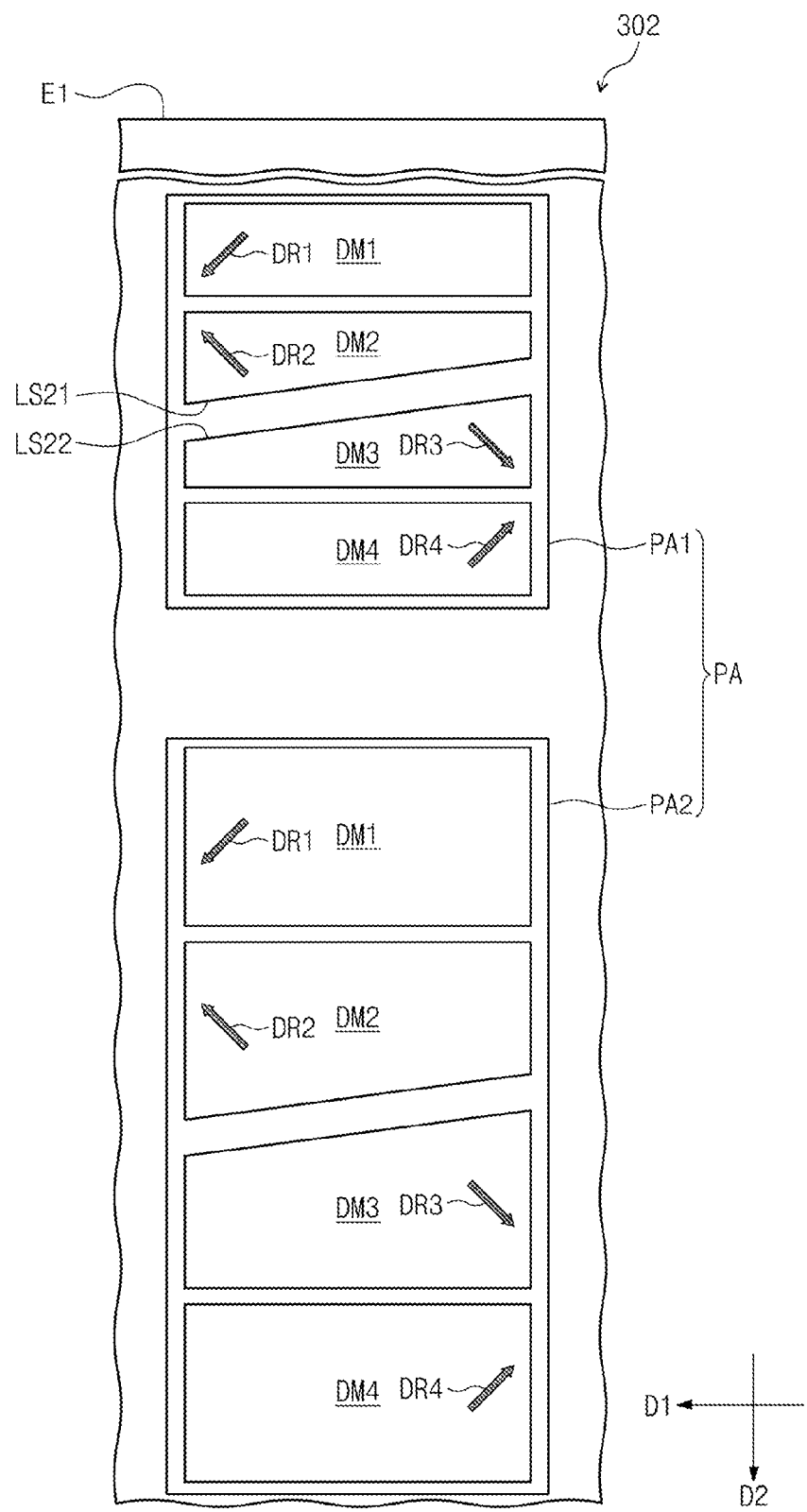
FIG. 6 is a view illustrating a plurality of domains defined in the pixel area of a display panel included in a curved display device according to another exemplary embodiment of the present system and method.

FIG. 6 is a view illustrating a plurality of domains defined in the pixel area PA of a display panel 302 included in a curved display device according to another exemplary embodiment of the present system and method. The description of FIG. 6 below uses the same reference symbols as those used for the above-mentioned components. Thus, any repetitive descriptions of these components are omitted herein.

Referring to FIG. 6, a single pixel of the display panel 302 included in the curved display device is illustrated. A plurality of domains are defined in the first and second sub-pixel areas PA1 and PA2 of the pixel area PA. Among the domains defined in the first and second sub-pixel areas PA1 and PA2, the structures of the first to fourth domains DM1, DM2, DM3 and DM4 defined in the first sub-pixel area PA1 are described below.

In the present exemplary embodiment, each of the second and third domains DM2 and DM3 has a long side tilted with respect to the first edge E1 in a plan view, and a long side of each of the first and fourth domains DM1 and DM4 is parallel to the first edge E1 in a plan view.

More particularly, the second domain DM2 has a first long side LS21 tilted with respect to the first edge E1 in a plan view, and the third domain DM3 has a second long side LS22 tilted with respect to the first edge E1 in a plan view. In addition, each long side of the first and fourth domains DM1 and DM4 is parallel to the first edge E1.

When the second and third domains DM2 and DM3 have the first and second long side LS21 and LS22, the alignment of the liquid crystal molecules may be more easily controlled by a fringe field acting on the edges of the second and third domains DM2 and DM3 as described above with reference to FIG. 4.

Figure 7:
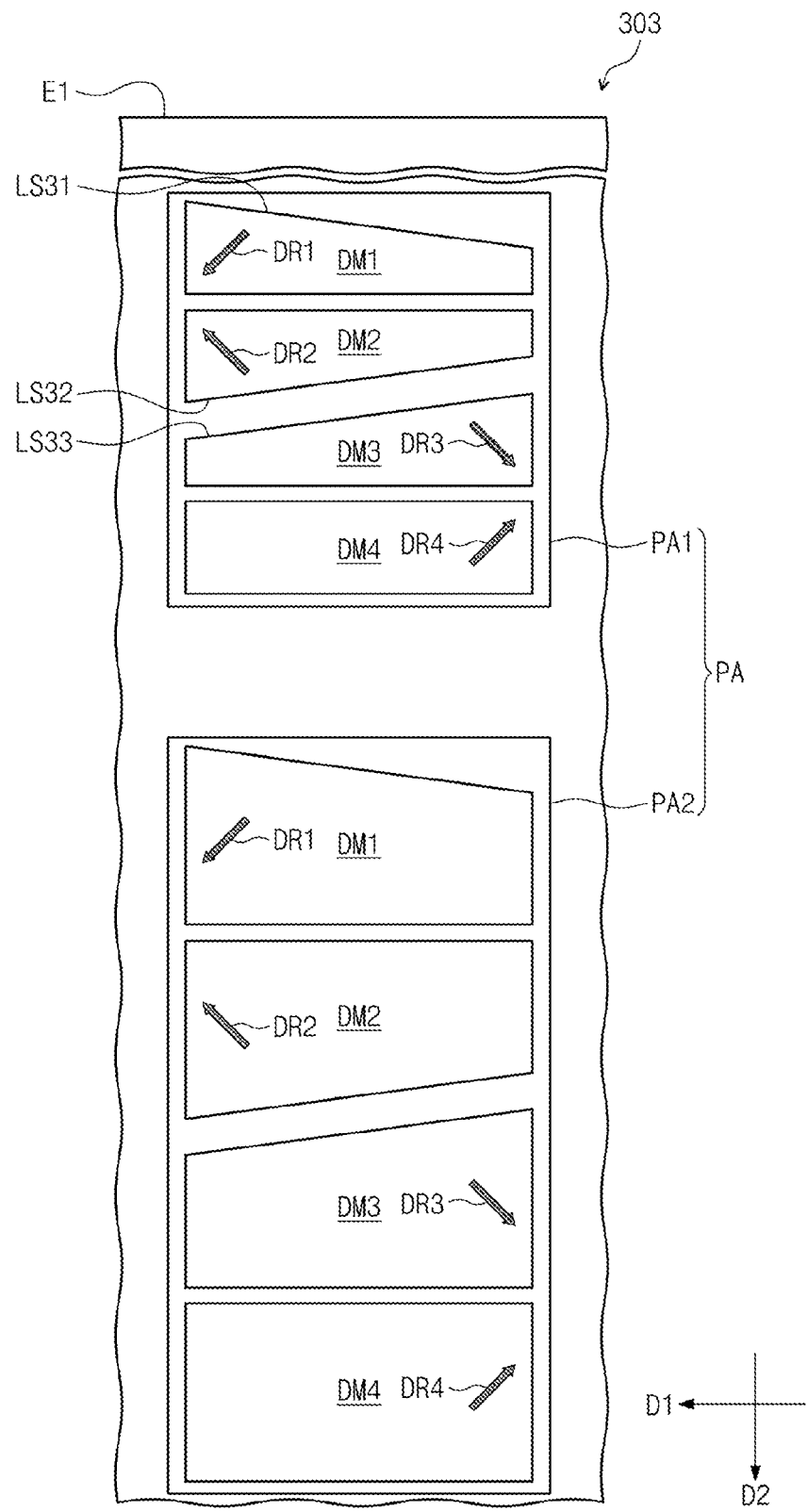
FIG. 7 is a cross-sectional view illustrating a plurality of domains defined in the pixel area of a display panel included in a curved display device according to another exemplary embodiment of the present system and method.

FIG. 7 is a view illustrating a plurality of domains defined in a pixel area PA of a display panel 303 included in a curved display device according to another exemplary embodiment of the present system and method. The description of FIG. 7 below uses the same reference symbols as those used for the above-mentioned components. Thus, any repetitive descriptions of these components are omitted herein.

Referring to FIG. 7, a single pixel of the display panel 303 included in the curved display device is illustrated. A plurality of domains are defined in the first and second sub-pixel areas PA1 and PA2 of the pixel area PA. Among the domains defined in the first and second sub-pixel areas PA1 and PA2, the structures of the first to fourth domains DM1, DM2, DM3 and DM4 defined in the first sub-pixel area PA1 are described below.

In the present exemplary embodiment, each of the first, second and third domains DM1, DM2 and DM3 has a long side tilted in a plan view with respect to the first edge E1 of the display panel 303, and each long side of the fourth domain DM4 is parallel to the first edge E1 in a plan view.

More particularly, the first domain DM1 has a first long side LS31 tilted with respect to the first edge E1 in a plan view, the second domain DM2 has a second long side LS32 tilted with respect to the first edge E1 in a plan view, and the third domain DM3 has a second long side LS33 tilted with respect to the first edge E1 in a plan view. In addition, each long side of the fourth domain DM4 is parallel to the first edge E1.

When the first to third domains DM1, DM2 and DM3 have the first to third long sides LS31, LS32 and LS33, the alignment of the liquid crystal molecules may be more easily controlled by a fringe field acting on the edges of the first to third domains DM1, DM2 and DM3 as described above with reference to FIG. 4.

Figure 8:
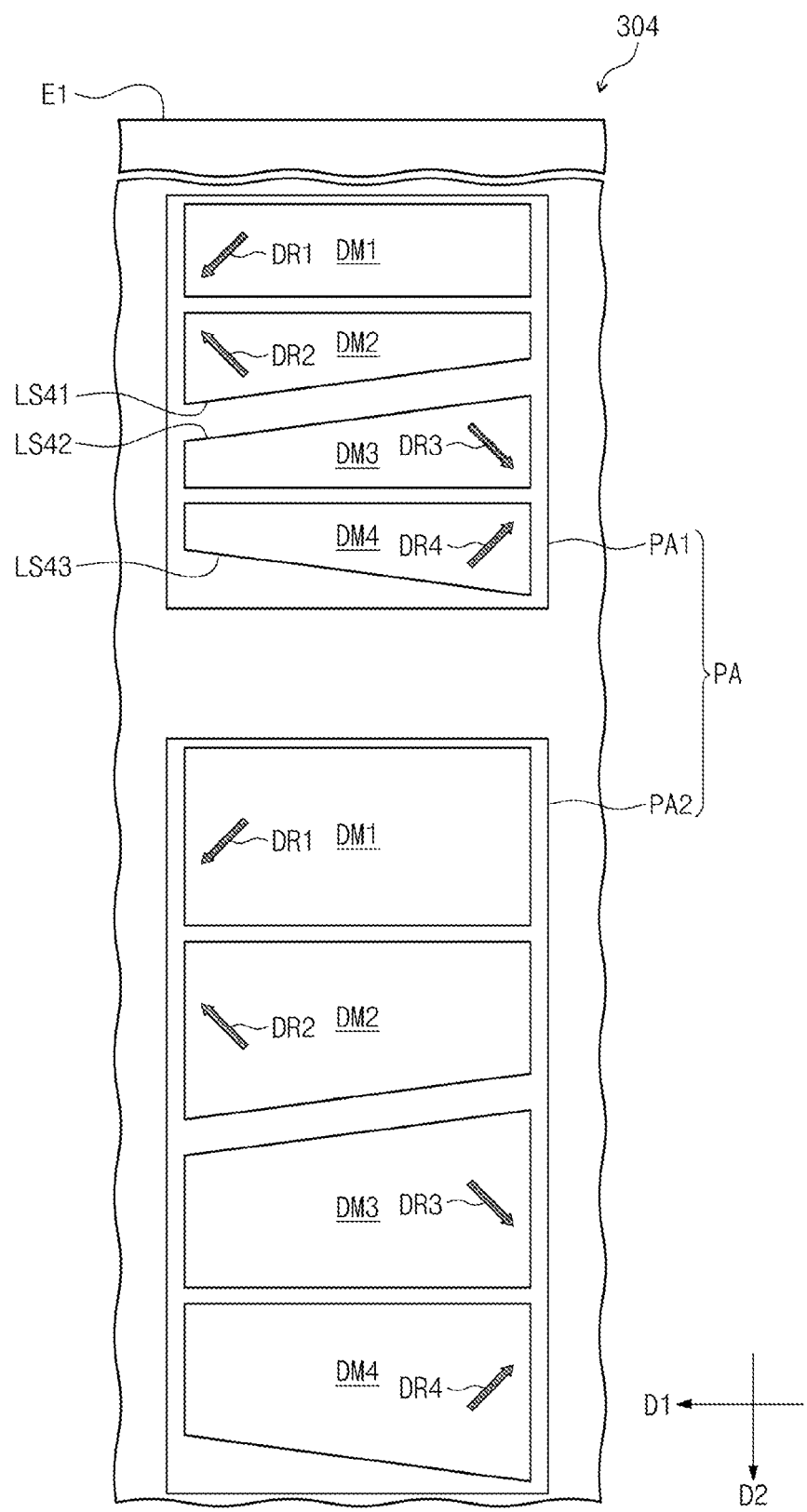
FIG. 8 is a view illustrating a plurality of domains defined in the pixel area of a display panel included in a curved display device according to another exemplary embodiment of the present system and method.

FIG. 8 is a view illustrating a plurality of domains defined in the pixel area PA of a display panel 304 included in a curved display device according to another exemplary embodiment of the present system and method. The description of FIG. 8 below uses the same reference symbols as those used for the above-mentioned components. Thus, any repetitive descriptions of these components are omitted herein.

Referring to FIG. 8, a single pixel of the display panel 304 included in the curved display device is illustrated. A plurality of domains are defined in the first and second sub-pixel areas PA1 and PA2 of the pixel area PA. Among the domains defined in the first and second sub-pixel areas PA1 and PA2, the structures of the first to fourth domains DM1, DM2, DM3 and DM4 defined in the first sub-pixel area PA1 are described below.

In the present exemplary embodiment, each of the second, third and fourth domains DM2, DM3 and DM4 has a long side tilted in a plan view with respect to the first edge E1 of the display panel 304, and a long side of the first domain DM1 is parallel to the first edge E1 in a plan view.

More particularly, the second domain DM2 has a first long side LS41 tilted with respect to the first edge E1 in a plan view, the third domain DM3 has a second long side LS42 tilted with respect to the first edge E1 in a plan view, and the fourth domain DM4 has a third long side LS43 tilted with respect to the first edge E1 in a plan view. In addition, each long side of the first domain DM1 is parallel to the first edge E1.

When the second to fourth domains DM2, DM3 and DM4 have the first to third long sides LS41, LS42 and LS43, the alignment of the liquid crystal molecules may be more easily controlled by a fringe field acting on the edges of the second to fourth domains DM2, DM3 and DM4 as described above reference to FIG. 4.

According to exemplary embodiments of the present system and method, by controlling the direction of a fringe field generated at an edge of a domain, controllability for controlling the alignment of the liquid crystal molecules at the edge of the domain may be enhanced. As a result, a decrease in light transmittance at the edge of the domain may be prevented, and thus, display quality of a curved display device may be enhanced.

While the present system and method are particularly illustrated and described herein with reference to exemplary embodiments thereof, those of ordinary skill in the art would understand that various changes in form and detail may be made without departing from the spirit of scope of the present system and method as defined by the following claims. Thus, the technical scope of the present system and method are not limited to the detailed description herein but defined by scopes of claims.

What is claimed is:

1. A curved display device, comprising:
   a display substrate having a plurality of pixel areas and a first side curved along a first direction;
   an opposite substrate facing the display substrate and coupled to the display substrate to be curved along the first direction; and
   a liquid crystal layer disposed between the display substrate and the opposite substrate,
   wherein in each of the plurality of pixel areas, a plurality of domains are arranged in a second direction intersecting with the first direction, and a side of at least one of the plurality of domains is tilted with respect to the first side in a plan view.

2. The curved display device of claim 1, wherein a long side of the at least one of the plurality of domains is tilted with respect to the first side in a plan view.

3. The curved display device of claim 2, wherein each of the plurality of domains has two short sides connected to the long side and facing each other, and the two short sides have lengths different from each other.

4. The curved display device of claim 3, wherein each of the short sides is parallel to the second direction.

5. The curved display device of claim 4, wherein the first direction is perpendicular to the second direction.

6. The curved display device of claim 2, wherein the display substrate has a second side parallel to the second direction, the first side is a long side of the display substrate, and the second side is a short side of the display substrate.

7. The curved display device of claim 2, wherein each of the plurality of pixel areas has a first sub-pixel area and a second sub-pixel area, and the plurality of domains comprise a first domain, a second domain, a third domain and a fourth domain sequentially arranged along the second direction in each of the first and second sub-pixel areas.

8. The curved display device of claim 7, wherein each of the first to fourth domains has a long side tilted with respect to the first side.

9. The curved display device of claim 7, wherein each of the first and fourth domains has a long side tilted with respect to the first side, and each of the second and third domains has a long side parallel to the first side in a plan view.

10. The curved display device of claim 7, wherein each of the second and the third domains has a long side tilted with respect to the first side in a plan view, and each of the first and fourth domains has a long side parallel to the first side in a plan view.

11. The curved display device of claim 7, wherein
    the display substrate comprises a pixel electrode disposed in each of the plurality of pixel areas,
    the opposite substrate comprises a common electrode facing the pixel electrode and configured to form an electric field together with the pixel electrode,
    wherein a portion of the pixel electrode extends in a direction tilted with respect to the first and second directions in a plan view to define the first to fourth domains.

12. The curved display device of claim 11, wherein alignment directions of liquid crystal molecules of the liquid crystal layer in response to the electric field are different from each other in the first to fourth domains.

13. The curved display device of claim 11, wherein the pixel electrode comprises:
    a first sub-pixel electrode disposed in the first sub-pixel area; and a second sub-pixel electrode disposed in the second sub-pixel area.

14. The curved display device of claim 13, wherein the display substrate further comprises:
a first data line electrically connected to the first sub-pixel electrode and configured to transmit a first data signal to the first sub-pixel electrode; and
a second data line electrically connected to the second sub-pixel electrode and configured to transmit a second data signal to the second sub-pixel electrode.

15. The curved display device of claim 13, wherein each of the first and second sub-pixel electrodes comprises:
first branch portions located in the first domain and extending in a direction tilted with the first and second directions in a plan view;
second branch portions located in the second domain and extending in a direction tilted with respect to the first and second directions in a plan view;
third branch portions located in the third domain and extending in a direction tilted with respect to the first and second directions in a plan view;
fourth branch portions located in the fourth domain and extending in a direction tilted with respect to the first and second directions in a plan view;
a first horizontal stem portion extending in the first direction to be connected to the first and second branch portions, and located between the first and second domains;
a second horizontal stem portion extending in the first direction to be connected to the third and fourth branch portions, and located between the third and fourth domains;
a first vertical stem portion extending in the second direction and connected to the first horizontal stem portions and the first and second branch portions; and
a second vertical stem portion extending in the second direction and connected to the second horizontal stem portions and the third and fourth branch portions.

16. The curved display device of claim 1, the display substrate has a display area where an image is displayed, and the display area has a curved shape curved in the first direction.

17. A curved display device, comprising:
a display substrate having a plurality of pixel areas and a first side curved along a first direction;
an opposite substrate facing the display substrate and coupled to the display substrate to be curved along the first direction; and
a liquid crystal layer disposed between the display substrate and the opposite substrate,
wherein the display substrate comprises a pixel electrode disposed in each of the plurality of pixel areas, the pixel electrode comprises branch portions disposed in each of the plurality of domains,
wherein in each of the plurality of pixel areas, a plurality of domains are arranged in a second direction intersecting with the first direction,
wherein a side connecting edges of the branch portions in each of the plurality of domains is defined, and the side is tilted with respect to the first side in a plan view.

18. The curved display device of claim 17, wherein the branch portions are extending in a direction tilted with the first and second directions in a plan view.

19. The curved display device of claim 17, wherein a long side of at least one of the plurality of domains is tilted with respect to the first side in a plan view.

20. The curved display device of claim 19, wherein each of the plurality of domains has two short sides connected to the long side and facing each other, and the two short sides have lengths different from each other.

* * * * *